US005538382A

United States Patent [19]
Hasegawa et al.

[11] Patent Number: 5,538,382
[45] Date of Patent: Jul. 23, 1996

[54] VARIABLE LEVEL LIFTING PLATFORM FOR A CARGO CONTAINER HANDLING CRANE

[75] Inventors: Shuji Hasegawa; Masamitsu Enoki, both of San Mateo, Calif.

[73] Assignee: Paceco Corp., San Mateo, Calif.

[21] Appl. No.: 253,808

[22] Filed: Jun. 3, 1994

[51] Int. Cl.$^6$ ................................................. B63B 27/10
[52] U.S. Cl. ................................. 414/141.7; 414/141.4; 414/142.8
[58] Field of Search ........................... 414/139.6, 139.9, 414/140.3, 141.4, 141.7, 142.8; 212/147, 148, 213, 273, 274, 319

[56] References Cited

U.S. PATENT DOCUMENTS 3,825,128  7/1974  Cooper ................................. 212/147
3,881,608  5/1975  Hupkes ................................. 414/141.7
4,172,685  10/1979  Nabeshima et al. ................. 414/140.3
5,314,262  5/1994  Meisinger et al. ................... 414/140.3

FOREIGN PATENT DOCUMENTS 1606436A  11/1990  U.S.S.R. ............................... 212/213

*Primary Examiner*—William E. Terrell
*Assistant Examiner*—Douglas A. Hess
*Attorney, Agent, or Firm*—Bruce & McCoy

[57] ABSTRACT

"A variable level platform suspended from the gantry of a cargo container handling gantry crane by a pair of scissors jacks with fleet through wire rope reeving for suspending a lifting spreader thereunder whereby the platform effectively shortens the spreader lift lines for reducing container sway and container handling cycle times."

7 Claims, 6 Drawing Sheets

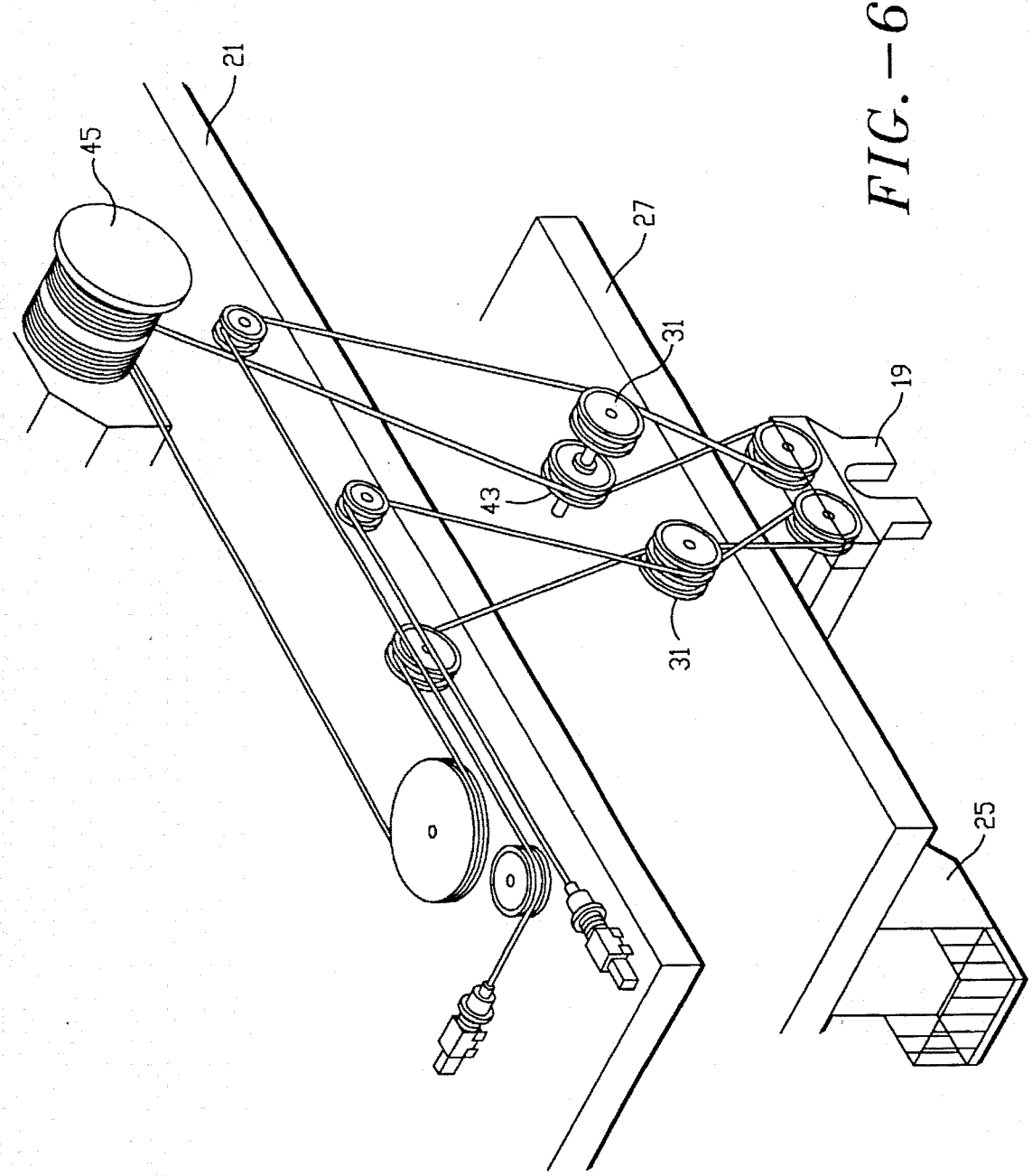

VARIABLE LEVEL LIFTING PLATFORM FOR A CARGO CONTAINER HANDLING CRANE

CROSS-REFERENCE TO RELATED APPLICATION

The present invention is related to: U.S. Patent Application Ser. No. 08/117,113 for Cargo Container Transfer Systems for Cranes filed Dec. 31, 1993; U.S. patent application Ser. No. 08/225,842 for A Telescoping Shuttle for a Cargo Container Handling Crane, filed Apr. 11, 1994; and U.S. patent application Ser. No. 08/225,843 for A Guide Chute for Cargo Container Handling Cranes, filed Apr. 11, 1994, by Shuji Hasegawa and Masamitsu Enokl and assigned to Paceco Corp., which are incorporated herein by reference.

BACKGROUND OF THE INVENTION

1. Field of the Invention

The present invention relates to improved apparatus and novel methods of operation for cargo container handling cranes having a horizontal gantry supported at an elevated location above the cargo container pickup and deposition areas. More particularly, the present invention relates to the apparatus and reel hod for abating residual sway during cargo container handling by employing a variable level lifting platform, for sway arrest in a cargo container handling crane, which transports containers horizontally along the gantry of the crane, to reduce container transfer cycle times.

2. Description of the Prior Art

The handling and protection of cargo or material during its transportation has been greatly facilitated by the advent of containerization many years ago. Raft mounted dockside gantry cranes having retractable booms have now been long accepted as the standard in the industry for loading and unloading containerized cargo and fungible bulk materials. The containers are moved by the cranes between waterborne vessels and dockside transportation equipment.

When a cargo container transport ship is berthed alongside a dock, a gantry crane is moved along the dock parallel to the ship to a position where a retractable boom can be extended across the beam of the ship above the ship's cells which are the cargo container carrying area. The retractable boom in its operating position extends horizontally outboard from the crane's superstructure and, in its retracted position, clears the superstructure of any ship berthed alongside the dock adjacent to the crane. Containers can be transported along the gantry of the crane between the dockside pickup and deposition area and any storage position located within the beam of a berthed ship in its holds or on its deck.

In the particular form of a gantry crane to which the present invention pertains, the purpose is to move cargo containers a specific horizontal distance from a pickup area to a deposition area. In each operation, in the most usual situation, the pickup area is either a dockside location where a container is picked off of a flatbed trailer or transport truck or railroad car, and moved outboard by the crane and lowered into a shipboard cargo container cell, or the reverse, wherein a container is lifted from a cell onboard ship and moved to a dockside storage area or a truck, trailer, or railroad car.

The gantry portion of the cargo container handling crane of the preferred embodiment of tile present invention includes the retractable boom and a dockside portion and a rear extension of said boom supported by the crane superstructure. However, it is applicable to any crane wherein containers are moved along a gantry from a pickup position to a deposition area. Trolleys run along tile gantry and suspend cargo container lifting spreaders from fleet-through wire rope reeving for attaching to and picking up cargo containers.

In a transfer cycle by a crane, the container must first be picked up, then lifted vertically, moved horizontally, and then lowered to its deposition area. During a portion of the move, vertical and horizontal movement of the container can occur simultaneously. However, for each transfer cycle, the crane must raise or lower a container a specific distance to clear the side of a ship, and a round trip transfer cycle takes a substantial period of time to handle one container.

In addition to the portion of the transfer cycle time required to pickup, lift, move, lower, and deposit the container, there is also a delay at each end of the cycle because of sway or pendulum movement which is induced into the load by virtue of the starting and stopping of the horizontal movement of the container lifting apparatus along the gantry. It takes additional time to abate the sway and to position the container by selectively controlling the forward and reverse movement of the trolley.

Numerous methods and apparatus have been developed for arresting sway in containers and lifting spreaders suspended by wire rope reeving. The problem is most acute at the shoreside container pickup and deposition areas where the containers are picked up or deposited close to ground level from or onto truck or trailer beds, railroad cars, or stacks of containers, and where the lifting spreader is suspended at its longest pendulum length for this purpose. Some of the methods and apparatus for arresting sway in suspended cargo containers are disclosed in the following patents: U.S. Pat. No. 3,375,938 for Anti-Sway Device; U.S. Pat. No. 3,532,324 for Antisway Mechanism; U.S. Pat. No. 3,739,922 for Sway-Arrest System Improvement; U.S. Pat. No. 3,825,128 for Sway-Arrest System; U.S. Pat. No. 3,945,504 for Anti-Sway System for a Spreader Suspended from a Crane; and U.S. Pat. No. 5,186,342 for Integrated Passive Sway Arrest System for Cargo Container Handling Cranes; all of which are assigned to the assignee of the present invention.

A more recent development in the field of cargo container handling is the development of the hatch coverless container ships which unfortunately has Increased the container transfer cycle time in the prior art gantry cranes. These ships were developed to reduce lashing work or container tie down time for containers stacked on the open deck of the ship. This development provides cell guides which project upwards from the deck of the ship and winch therefore require every vertical movement of a container to clear not only the side of the ship but the tops of all the upward projecting cell guides as well winch previously did not extend above the ship's deck.

Therefore, in comparison, when loading and unloading the old type of ship, the container did not always have to be fully lifted a specified height above the deck of the ship. It was only necessary to clear the deck of the ship until containers began to be stacked on top of the deck. At that point, it was still necessary only to lift containers over those already stacked on the deck although when a ship is properly loaded and unloaded, it is accomplished In a way in winch the outboard containers are placed on the ship first and unloaded last so that subsequent containers do not have to be lifted over more than the minimum height of on-deck containers than is necessary.

Further, the container handling productivity for hatch coverless ships is considerably lower in comparison with conventional container ships because the handling pass or transfer cycle on the latter is substantially shorter until stacked containers on the ship gradually increase the time of the handling pass or transfer cycle.

The present invention lowers the cycle transfer time by reducing the time for arresting residual sway of the cargo container lifting apparatus at the shipside deposition and pickup areas. It includes new and novel apparatus and methods of operation. A variable level platform is mounted on the gantry of the crane and telescopes up and down to lift and lower the sheaves which suspend the cargo container lifting spreaders. The platform traverses the gantry between the shoreside and shipside container pickup and deposition areas. It is suspended from trolleys and horizontally transports containers between the areas. This arrangement shortens the length of the wire rope reeving supporting the cargo container lifting spreader when picking up a container or depositing it in the cells of a ship and helps arrest the residual sway in the lifting spreader at the shipside end of the crane.

SUMMARY OF THE INVENTION

The present invention consists of a variable level lifting spreader suspension platform for a cargo container handling crane having a horizontal gantry supported at an elevated location above container pickup and deposition areas and having a trolley mounted on rafts which is movable along the gantry. The spreader suspension platform is suspended below the trolley and has pass through sheaves mounted thereon for fleeting wire rope reeving through the platform to a cargo container lifting spreader headblock suspended below the platform. A lifting and lowering mechanism is provided interconnects the platform to the trolley and is formed to maintain the platform level during lifting and lowering and while the trolley moves along the gantry.

The present invention also includes the method of arresting sway in a load-carrying means suspended from a movable trolley mounted on a gantry. It includes providing the trolley with a variable level lifting platform suspended below the trolley. Pass through sheaves are mounted on the trolley for fleeting wire rope reeving through the platform. A lifting spreader headblock is suspended below the platform by the reeving, and the platform is lowered as close to the load pickup or deposition area as possible when a lifting spreader is secured to the headblock and is attempting to attach to or deposit a load.

OBJECTS OF THE INVENTION

It is therefore an important object of the present invention to provide a new and novel method and apparatus for reducing the cycle time of the operation of a cargo container handling crane.

It is another object of the present invention to provide a method and apparatus for arresting sway in the container lifting apparatus of a cargo container handling crane.

It is a further object of the present invention to provide a method and apparatus for shortening the suspension ropes at the shipside end of a cargo container handling operation.

It is still another object of the present invention to provide a variable level lifting spreader suspension platform for a cargo container handling gantry crane which lowers the level of the sheaves which support the cargo container lifting spreaders with respect to the crane gantry while transporting containers between container pickup and deposition areas.

And it is yet a further object of the present invention to arrest residual sway in a lowered cargo container by shortening the length of the suspension ropes.

Other objects and advantages of the present invention will become apparent when the apparatus and methods of the present invention are considered in conjunction with tile accompanying drawings.

DESCRIPTION OF THE DRAWINGS

FIG. 6 is a perspective schematic view of the wire rope reeving of the variable level platform of FIG. 5 for a machine trolley.

DESCRIPTION OF THE PREFERRED EMBODIMENT

Reference is made to the drawings for a description of the preferred embodiment of the present invention and the prior art wherein like reference numbers represent like elements on corresponding views.

Figure 1:
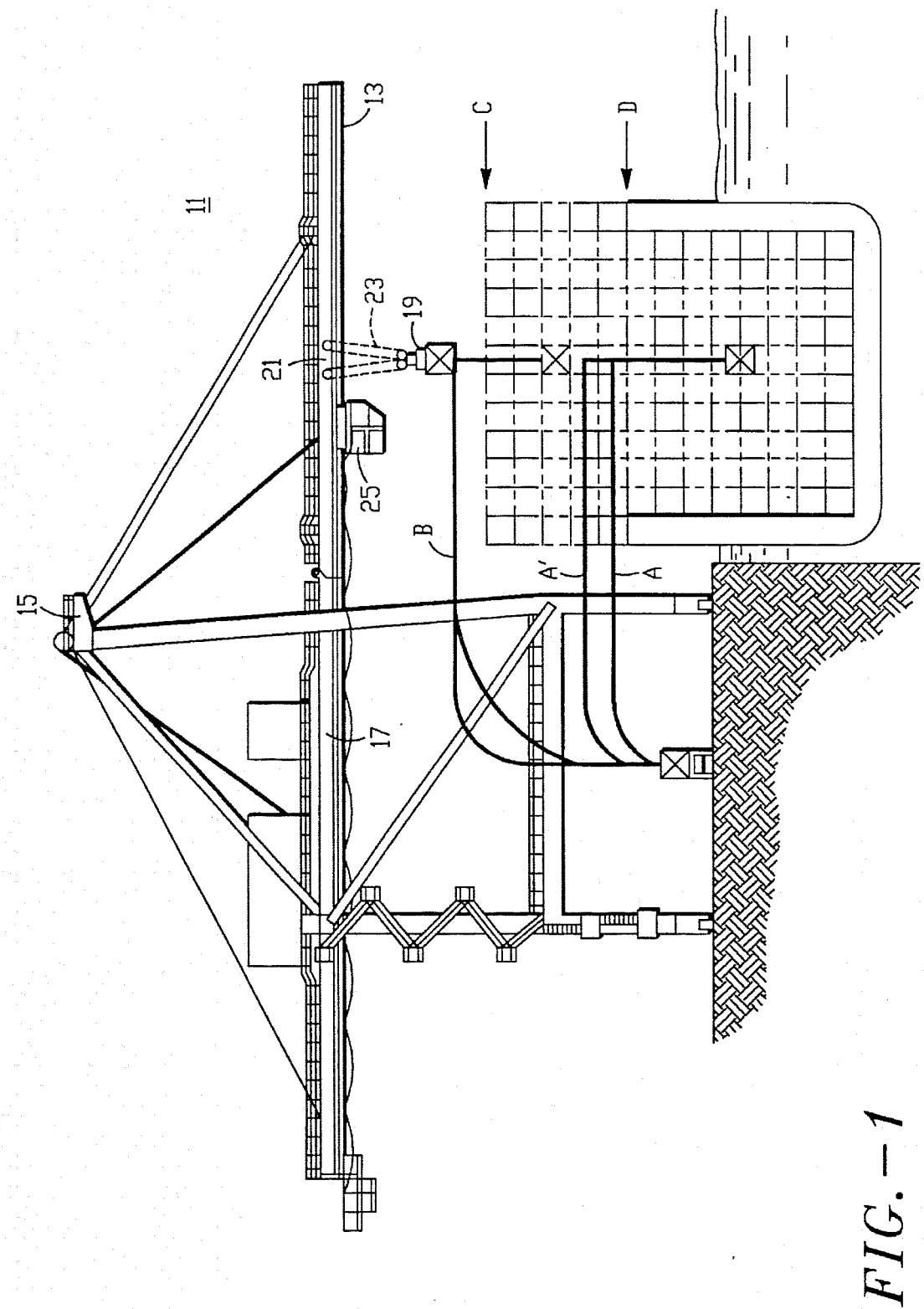
FIG. 1 is a side elevation of a prior art cargo container handling gantry crane illustrating the loading of both standard and hatch coverless container ships shown in partial cross-section.

Reference is made to FIG. 1 of the drawings for an illustration of the prior art. Thereshown is a cargo container handling gantry crane 11 with a retractable boom 13 which projects outboard from the superstructure 15 of the crane over the beam of a ship berthed alongside the dock. The boom in the illustrated embodiment folds upward to project Just short of vertical whereby the superstructure of a ship can pass alongside the dock and not interfere with the boom when it is raised. In other types of gantry cranes, where height restrictions limit raising the boom, typically in ports located near airports, the gantry can be articulated to fold or made to slide horizontally outboard over a ship.

The horizontal gantry 17 of the crane extends rearward of the retractable boom in a portion which resides within the superstructure of the crane, and projects further rearward out over a storage area on the landside end of the crane. It is supported at an elevation above container pickup and deposition areas. The gantry is designed to project outboard over a ship moored alongside a dock and the crane superstructure 15 is designed to straddle the dockside cargo container pickup and deposition areas to move containers from and to shoreside transportation. Railroad tracks and roadways pass underneath the superstructure and the rear projection of the crane for the delivery and removal of cargo containers thereunder by transportation equipment.

The hoist, transfer, and lowering cycle paths of a cargo container, between shoreside and ship pickup and deposition locations, are represented by the black solid lines which show the container movement paths. When loading a standard container ship, the containers need be lifted only high enough to clear the side of the ship, and the raise and lowering cycles are greatly reduced as are illustrated by container transfer paths A and A'. This occurs because the container cells are all disposed within the hold of a ship illustrated by the dashed lines. Container path A represents movement of containers into the ship holds. Once the ship has been filled, then containers are stacked on top of the deck of the ship and lashed thereto. The deck level of the ship is designated by D. During this portion of the loading sequence, the containers must be lifted only high enough to clear any on-deck containers represented by container path A' where one level of containers is lashed on deck.

The hatch coverless type of ship is also illustrated by this same illustration by showing the dashed lines of the cells extending to C above the ship's deck D. Thus, for the deposition of each container on a hatch coverless ship, it must be raised to clear all of the cell structure above the deck of the ship for each container transfer cycle represented by container path B. While the time needed to lash the containers to the deck is greatly reduced by the hatch coverless ship the cycle time for container transfer is increased for each container because of the additional specific lifting and lowering distance which must be covered during each cycle to clear the cell structures on top of the deck of the ship.

Once a cargo container is picked up by a lifting spreader 19 suspended from a trolley 21 mounted to traverse the gantry 17, computer control of the trolley lifts and horizontally transports the container to the deposition area where the operator takes over and sets the container down. Standard computer control of the trolley utilizes an encoder which counts revolutions of the drive motors or wire rope drums which operate the drive machinery and hoist ropes 23. An optical pulse generator is created by passing an optical beam through a perforated disk which is secured to the drive motors or wire rope drums. An optical detector senses the breaks in the optical beam caused by the disk, and they are counted by the computer whereby the exact position of a cargo container, both vertically and horizontally, with respect to the gantry, and the relative movement with respect thereto, can be accurately determined, and thereby the transfer of the containers accurately controlled. This is fundamental technology in cargo container handling by a crane, and once a container has been attached to a container or released, movement of the trolley and the spreader is computer controlled.

However, operator control is required at each end of the cycle for two purposes: attachment of a lifting spreader to a container, and positioning of a container for deposition. The operator must accurately locate the spreader above a container for pickup at the landside end of the crane, from a trailer, truck, or railroad car, or from a stack of containers in a storage area or freestanding on the deck of a ship. The operator must also accurately locate a spreader carrying a container for lowering into a ship's cell or onto a truck, trailer, or railroad car, or onto a stack of containers in a storage area or freestanding on the deck of a ship. For this purpose, the operator's cab 25 is secured to the trolley to move with it to keep as close proximity as possible to the container pickup and deposition areas. The operator has control of horizontal movement of the trolley and vertical control of the movement of the cargo container lifting spreader during pickup and deposition of a load.

Figure 2:
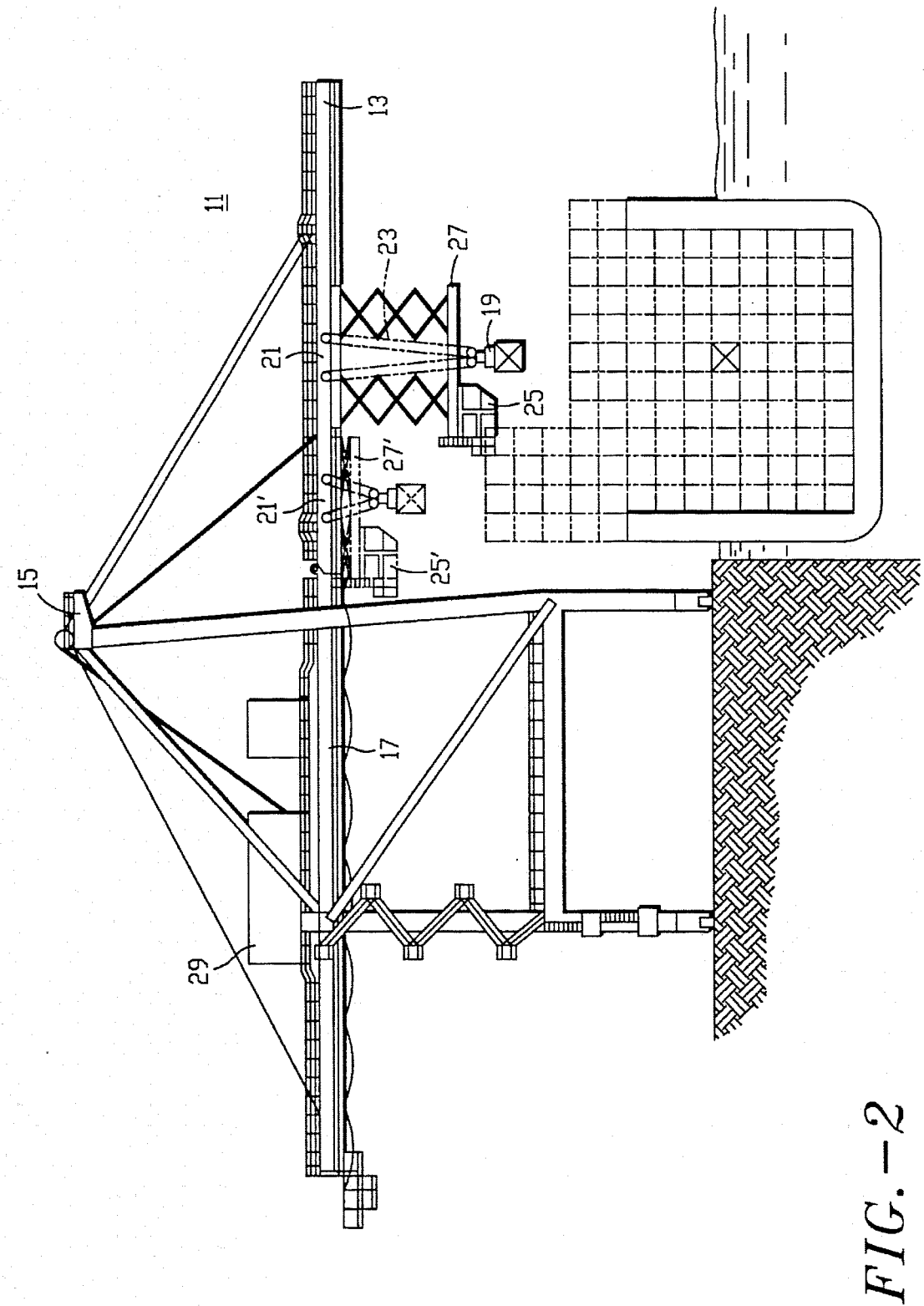
FIG. 2 is a side elevation of an improved cargo container handling gantry crane illustrating the variable level lifting spreader suspension platform of the present invention suspended from a trolley mounted on the gantry thereof.

Reference is made by FIG. 2 of the drawings hereto which illustrates the configuration of the preferred embodiment of the lowerable platform of the present invention which is designed to reduce cargo container transfer cycle time. In the present invention, the lifting and movement of containers is likewise computer controlled. However, part of the lifting cycle of the spreader is integrated with the lifting and lowering of the variable level lifting spreader suspension platform 27. Thereshown are two illustrations of the platform 27 although only one trolley 21 and platform exists per crane. The purpose is to illustrate the platform both in lowered (regular numbers) and in raised (prime numbers) position.

Illustrated in FIG. 2 is an overall view of the improvement to the prior art. A standard cargo container handling gantry crane 11 has a trolley 21 mounted for horizontal movement along the gantry thereof. A lifting spreader headblock 19 is suspended below the trolley by wire rope reeving 23 for attachment to different size lifting spreaders to handle different length cargo containers. The trolley includes a variable level lifting spreader suspension platform 27 suspended below the trolley and secured thereto with means for lifting and lowering the platform. The wire rope suspending the headblock passes through sheaves mounted on the platform.

Figure 3:
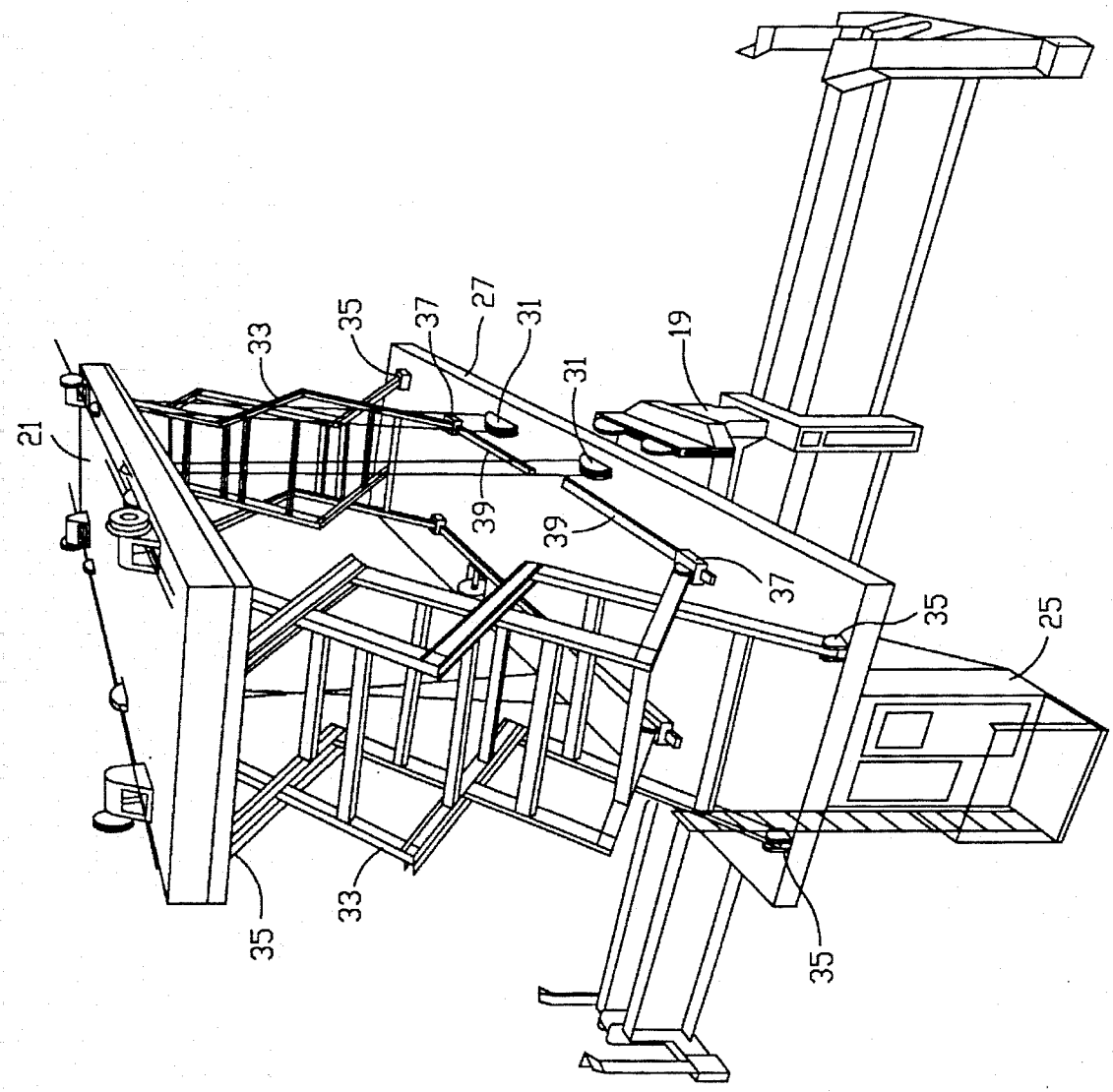
FIG. 3 is a broken out perspective view of a variable level platform for a cargo container handling gantry crane of the present invention for fleet through reeving.
Figure 4:
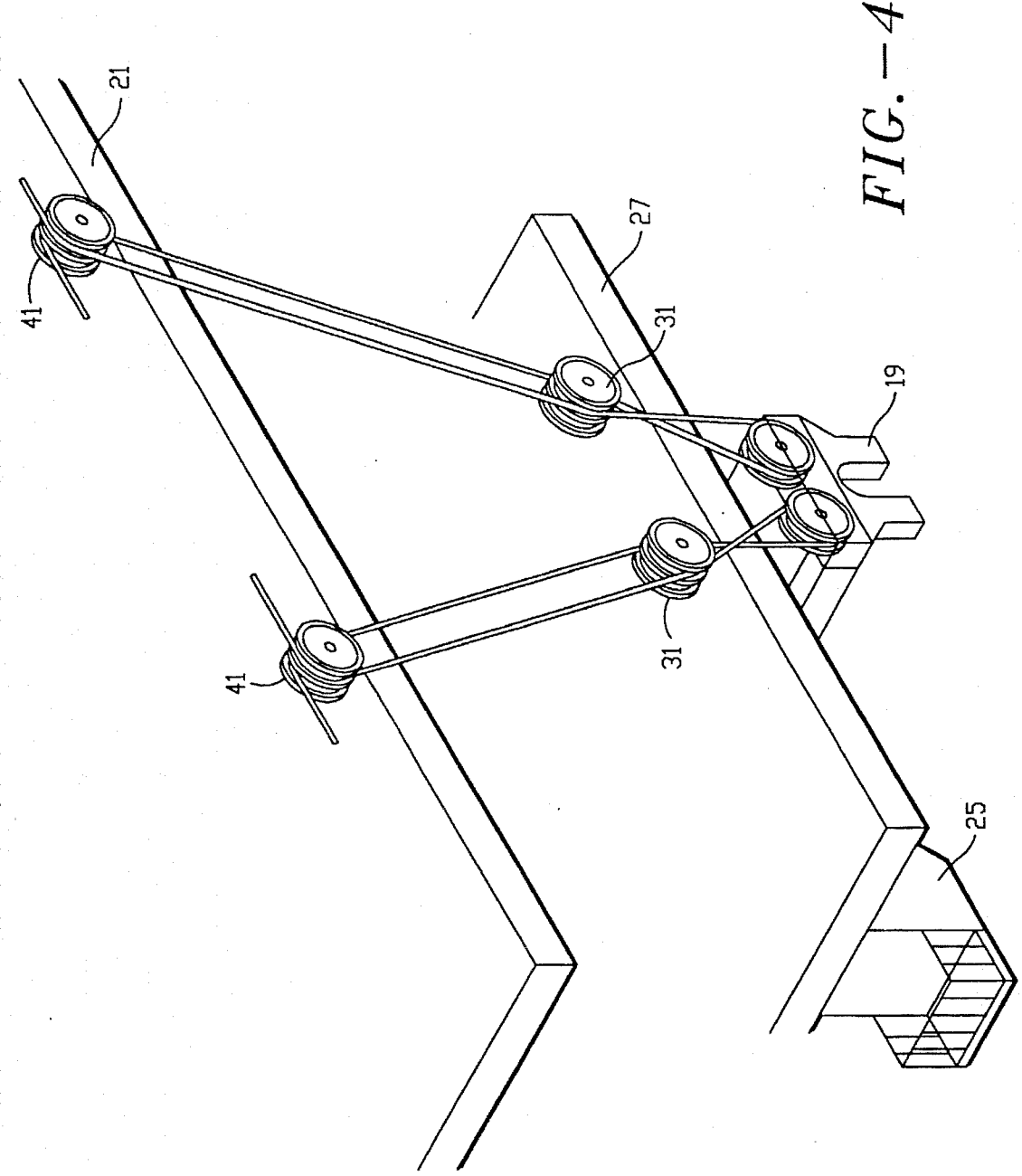
FIG. 4 is a perspective schematic view of the wire rope reeving of the variable level platform of FIG. 3 for fleet through reeving.
Figure 5:
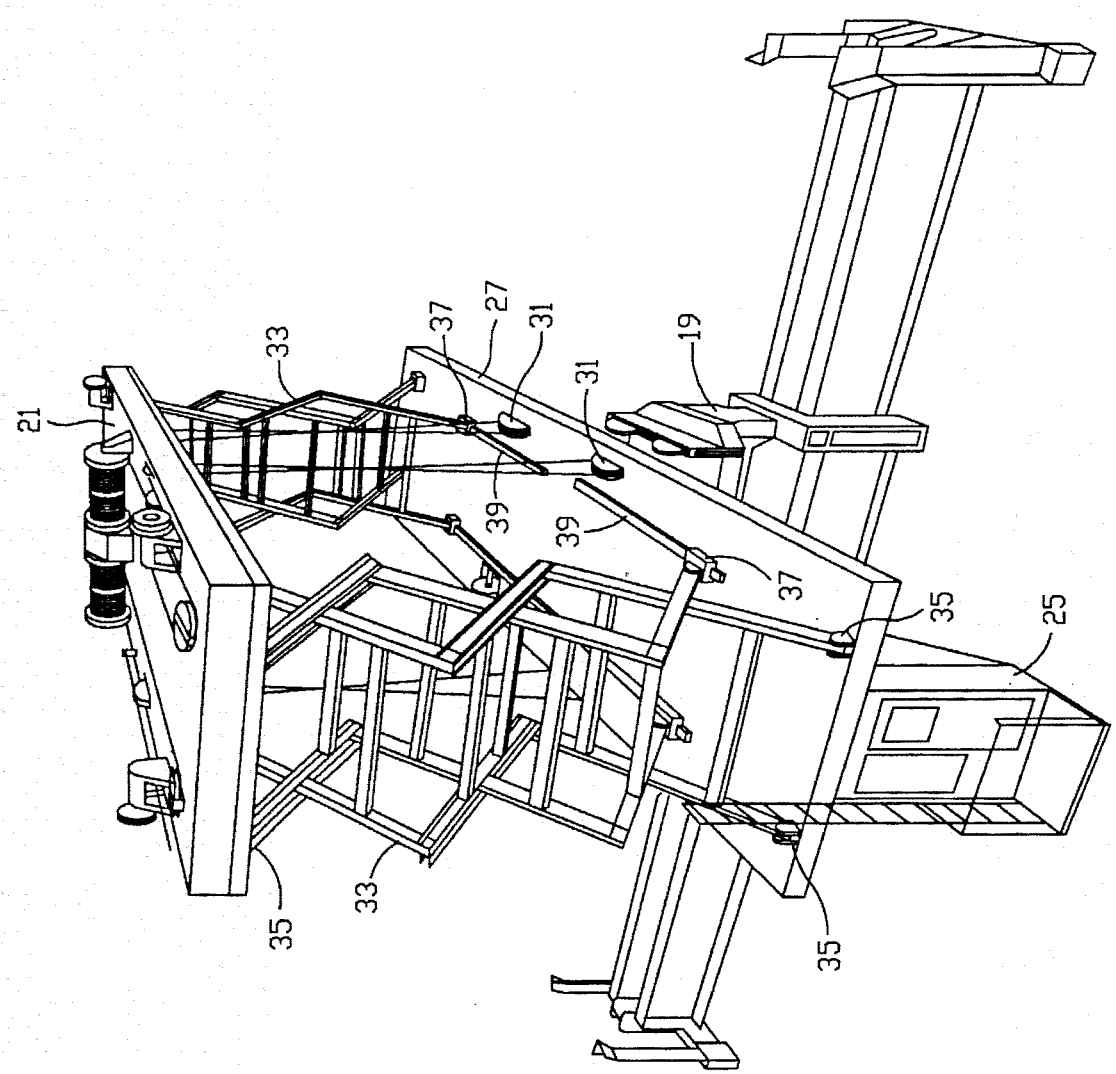
FIG. 5 is a broken out perspective view of a variable level platform for a cargo container handling crane of the present invention utilizing a machine trolley.

There are generally two types of cranes: those utilizing fleet through reeving and those utilizing machine trolleys. In the former, the winches which drive the wire rope reeving 23 which lifts and lowers the suspended cargo container lifting spreader headblocks 19 suspended from the trolleys 21 are mounted in a machinery house 29 mounted on the crane superstructure 15. The wire rope reeving fleets through sheaves mounted on tile trolleys as they move along the crane gantry. This type of reeving is illustrated in FIGS. 3 and 4. In the other type of crane, the container hoist winches are mounted on the machine trolley and move with the trolley along the gantry 17. Tins type of reeving is illustrated in FIGS. 5 and 6. The present invention is adaptable to either type of crane. The variable level lifting spreader suspension platform is designed for use with any type of cargo container handling crane having a horizontal gantry supported at an elevated location above container pickup and deposition areas and having a trolley mounted on rafts which is movable along the gantry.

Reference is made to FIGS. 3 to 6. The variable level platform 27 of the present invention is suspended below the trolley 21 and has pass through sheaves 31 mounted thereon for fleeting the wire rope reeving 23 through the platform to a cargo container lifting spreader headblock 19 suspended below the platform. An operator's cab 25 is secured to the platform for controlling the lifting spreader headblock. The close proximity of the operator's cab to the lifting spreader during attachment to cargo containers and deposition of containers at their destination enhances the operator's ability to minimize container transfer cycle times.

A lifting and lowering mechanism interconnects the platform to the trolley and is formed to maintain the platform trolley level during lifting and lowering thereof, and while the trolley moves along the gantry. The mechanism includes at least one powered mechanical scissors jack 33 having a series of interconnected legs pivoted at their ends and middle to each other. The ends of the scissors jack are secured to the trolley and the platform where by as the scissors jack is expanded or contracted the platform raises and lowers below the trolley. In the preferred embodiment of the invention, the lifting and lowering mechanism includes two pairs of scissor jack mechanisms disposed at opposite ends of the platform, with one pair of legs of each pair of scissors jacks at both the top and the bottom of the mechanisms pivotably secured 35 to the platform and the trolley, respectively. The other pair of legs of each pair of scissors jacks are movably secured 37 to the platform and the trolley, respectively. A means is provided for reciprocating the other pair of legs of each pair of scissor jacks along the platform and trolley respectively, to lift and lower the pairs of scissor jacks and the platform. In the preferred embodiment, the movable ends of the legs of the scissors jacks are mounted on rafts 39 and are moved therealong by motor-driven jack screws. The platform trolley can be motor-driven along the gantry, but in most practicality is wire-rope controlled for compatibility with computer control of the trolleys and center of gravity considerations of the platform.

FIGS. 4 and 6 of the drawings are schematic perspective views of the wire rope reeving for the two different kinds of cranes. FIG. 3 represents a trolley and platform using fleet through reeving with the container hoist machinery located in the machinery house on the crane's superstructure. The wire ropes from the machinery house are sheaved downward 41 to the variable level lifting spreader suspension platform 27 and then are sheaved 31 angularly to the lifting spreader headblock 19 suspended below the platform. The angled reeving increases the residual sway arrest function of the variable level platform. FIG. 4 represents the reeving of the fleet through suspension system 45.

Reference is made to FIG. 5 for an illustration of a machine trolley having the load hoist winches mounted thereon. As with the fleet through reeving arrangement, the ropes are angled to increase the sway arrest effect on the headblock. FIG. 6 represents the reeving required for a machine trolley with the sheaves mounted on the variable level platform as having a floating sheave 43 which aligns with the wire rope tangential point on the hoist drums.

The present invention effects the greatest sway arrest capability by virtue of the fact that the lifting spreader headblock 19 can be hoisted during transport into close proximity with the variable level lifting spreader suspension platform 27 thereby shortening the suspension ropes and greatly eliminating pendulum sway.

The present invention also includes the method of arresting sway in a load carrying means suspended from a movable trolley mounted on a gantry it includes providing the trolley with a variable level lifting spreader platform suspended below the trolley and mounting pass through sheaves on the trolley for fleeting wire rope reeving through the platform. A lifting spreader headblock is suspended below the platform by the reeving and is lifted close to the platform during horizontal transport of a lifting spreader with or without a container attached thereto by lifting the spreader as close to the platform as possible during horizontal transport of the lifting spreader, and then lowering the platform as close to the load pickup or deposition area as possible when a lifting spreader is secured to the headblock and is attempting to attach to or deposit a load. This method is enhanced by suspending an operator's cab below the platform for controlling the horizontal movement of the trolley along the gantry and the vertical movement of the headblock. The method is further enhanced by including the step of lifting and lowering the platform by a scissors jack which is interconnected between the trolley and the platform for stability of the structure.

Thus, it will be apparent from the foregoing description of the invention in its preferred form that it will fulfill all the objects and advantages attributable thereto. While the apparatus and method of the present invention have been illustrated and described in considerable detail, the Invention is not to be limited to such details as have been set forth except as may be necessitated by the appended claims.

We claim:

1. A variable level lifting spreader suspension platform for a cargo container handling crane having a horizontal gantry supported at an elevated location above container pickup and deposition areas and having a trolley mounted on rafts which is movable along said gantry, comprising a platform suspended below said trolley and having pass through sheaves mounted thereon for fleeting wire rope reeving through said platform to a cargo container lifting spreader headblock suspended from said platform, a lifting and lowering mechanism interconnecting said platform to said trolley, said mechanism formed to maintain said platform level during lifting and lowering thereof and while said trolley moves along said gantry.

2. The variable level lifting spreader suspension platform of claim 1 including an operator's cab secured to said platform for controlling a lifting spreader headblock suspended below said platform.

3. The variable level lifting spreader suspension platform of claim 1 wherein said lifting and lowering mechanism includes at least one powered mechanical scissors jack having a series of interconnected legs pivoted at their ends and middle to each other, the ends of said scissors jack being secured to said trolley and said platform whereby as said scissors jack is expanded or contracted, said platform raises and lowers below said trolley.

4. The variable level lifting spreader suspension platform of claim 3 wherein said lifting and lowering mechanism includes two pairs of scissors jack mechanisms disposed at opposite ends of said platform with one pair of legs of each pair of scissors jacks at both the top and the bottom of the scissors jack mechanisms pivotally secured to said platform and said trolley respectively, the other pair of legs of each pair of scissors jacks being movably secured to said platform and said trolley respectively, and means are provided for reciprocating said other pair of legs of each pair of scissor jacks along said platform and said trolley respectively, to lift and lower said pairs of scissors jacks and said platform.

5. A variable level lifting spreader suspension platform for a cargo container handling crane having a horizontal gantry supported at an elevated location above container pickup and deposition areas and having a trolley mounted on rails which is movable along said gantry, comprising a platform suspended below said trolley and having pass through sheaves mounted thereon for fleeting wire rope reeving through said platform to suspend a cargo container lifting spreader headblock below said platform, a lifting and lowering mechanism interconnecting said platform to said trolley and formed to maintain said platform level during lifting and lowering thereof and while said trolley moves along said gantry, said mechanism including two pairs of scissors jack mechanisms disposed at opposite ends of said platform with one pair of legs of each pair of scissors jacks at both the top and the bottom of the scissors jack mechanisms pivotally secured to said platform and said trolley respectively, the other pair of legs of each pair of scissors jacks being movably secured to said platform and said trolley respectively, and means for reciprocating said other pair of legs of each pair of scissor jacks along said platform and said trolley respectively to lift and lower said pairs of scissors jacks and said platform.

6. The method of arresting sway in a load carrying means suspended from a movable trolley mounted on a gantry comprising providing said trolley with a variable level lifting platform suspended below said trolley, mounting pass through sheaves on said platform for fleeting wire rope reeving through said platform, suspending a lifting spreader headblock below said platform by said reeving, lifting the headblock as close to the platform during horizontal movement thereof as permitted by transfer cycle time, and lowering said platform as close to the load pickup or deposition area as possible when a lifting spreader is secured to said headblock and is attempting to attach to or deposit a load.

7. The method of claim 6 including file step of lifting and lowering said platform by a scissors jack interconnected between said trolley and said platform.

\* \* \* \* \*